United States Patent
Han et al.

(10) Patent No.: US 7,263,589 B2
(45) Date of Patent: Aug. 28, 2007

(54) APPARATUS AND METHOD FOR CONTROLLING BOOTING OPERATION OF COMPUTER SYSTEM

(75) Inventors: Hyung Guk Han, Kyunggi-Do (KR); Byung Chuel Kim, Kyunggi-Do (KR); Jae Ung Han, Seoul (KR); Do Gwang Rha, Kyunggi-Do (KR)

(73) Assignee: LG Electronics Inc., Seoul (KR)

( * ) Notice: Subject to any disclaimer, the term of this patent is extended or adjusted under 35 U.S.C. 154(b) by 327 days.

(21) Appl. No.: 10/913,518

(22) Filed: Aug. 9, 2004

(65) Prior Publication Data

US 2005/0066145 A1    Mar. 24, 2005

(30) Foreign Application Priority Data

Aug. 8, 2003 (KR) ............... 2003-54952
Sep. 1, 2003 (KR) ............... 2003-60842

(51) Int. Cl.
*G06F 12/14* (2006.01)
*G06F 12/16* (2006.01)
*G06F 9/24* (2006.01)
*G06F 15/177* (2006.01)

(52) U.S. Cl. .................. 711/163; 711/152; 713/1; 713/2

(58) Field of Classification Search ............... 711/163, 711/164, 152; 713/1, 2
See application file for complete search history.

(56) References Cited

U.S. PATENT DOCUMENTS

| 5,966,732 | A | 10/1999 | Assaf | |
|---|---|---|---|---|
| 7,024,549 | B1 * | 4/2006 | Luu et al. | 713/2 |
| 7,024,581 | B1 * | 4/2006 | Wang et al. | 714/2 |
| 2003/0014619 | A1 * | 1/2003 | Cheston et al. | 713/1 |
| 2004/0243759 | A1 * | 12/2004 | Itoh et al. | 711/112 |
| 2005/0021919 | A1 * | 1/2005 | Kroening | 711/165 |

* cited by examiner

*Primary Examiner*—Jack Lane
(74) *Attorney, Agent, or Firm*—Birch, Stewart, Kolasch & Birch, LLP

(57) ABSTRACT

An apparatus and method for managing a memory of a computer and controlling a booting operation of the computer, are provided. The computer includes a memory having a user area and a protected security area (PSA). The user area has a management area. The method includes assigning a first partition to the user area of the memory; storing first partition information in the management area of the user area, the first partition information pertaining to the first partition; assigning a second partition to the PSA in response to an access signal, the access signal authorizing access to the PSA; storing, in the management area, second partition information pertaining to the second partition; storing the second partition information in the PSA; and removing the second partition information from the management area after storing the second partition information in the PSA.

43 Claims, 8 Drawing Sheets

APPARATUS AND METHOD FOR CONTROLLING BOOTING OPERATION OF COMPUTER SYSTEM

The present application claims, under 35 U.S.C. § 119, the priority benefit of Patent Application No. P2003-054952 filed on Aug. 8, 2003 in Republic of Korea; and Patent Application No. P2003-060842 filed on Sep. 1, 2003 in Republic of Korea.

BACKGROUND OF THE INVENTION

1. Field of the Invention

The present invention relates to an apparatus and method for controlling a booting operation of a computer system, and more particularly to an apparatus and method for appropriately recovering a system using data stored in a hidden area of a HDD (Hard Disk Drive).

2. Description of the Related Art

Computers such as a desktop computer, a notebook computer, etc., are being improved in their performances of various aspects such as miniaturization, multi-processing, and high-speed controlling. Recently, the computers are configured so that they can internally include various peripherals for performing individual operations as well as a main routine configuration for use in an operation of a CPU (Central Processing Unit) or can be used in a state where various peripherals are connected. For example, an audio device, a modem, a network device, a floppy disk drive, a CD-ROM (Compact Disc-Read Only Memory) drive and a DVD (Digital Versatile Disc) player can be mounted in the computer, such that these components can operate separately from the main routine. As described above, the recent computer can perform various functions based on the improved performance. Moreover, it is predicted that the computer's function will be generally extended.

As the number of uses of the computer increases and the number of computer users increases according to the extended function of the computer, a computer system may be frequently damaged due to an erroneous operation, a program error, etc.

Because the computer system may be damaged, and more particularly because a booting operation performed by a HDD may be erroneous, a recovery CD-ROM or floppy disk, etc. is provided together with a computer when the computer is conventionally purchased so that the computer system can be appropriately recovered.

However, because the recovery CD-ROM is employed only when the computer system is damaged or when an OS (Operating System) of the computer, for example, Windows™, must be recovered, the number of uses of the recovery CD-ROM is very small. Moreover, as the recovery CD-ROM may be used a long time after purchasing the computer, a user may lose the recovery CD-ROM or may be unable to remember a place where the user placed the recovery CD-ROM. When the recovery CD-ROM is lost, the user is inconvenienced because he/she must receive an additional service so that the computer can be recovered. Moreover, there is a problem in that additional costs required for manufacturing the recovery CD-ROM or floppy disk are imposed on a computer distributor or manufacturer when the recovery CD-ROM or floppy disk is additionally manufactured. In addition, service for recovering the use environment of the computer must be continuously provided.

SUMMARY OF THE INVENTION

Therefore, the present invention has been made in view of the above problems and other problems.

Accordingly, the present invention provides a method and apparatus of managing a memory of a computer, which overcome the problems and limitations associated with the related art.

It is an object of the present invention to provide an apparatus and method that can recover a system without a special recovery CD-ROM (Compact Disc-Read Only Memory) or floppy disk.

It is another object of the present invention to provide an apparatus and method that can access a hidden area of a HDD (Hard Disk Drive).

It is another object of the present invention to provide an apparatus and method that can store and manage an MBR (Master Boot Record) necessary for accessing a hidden area and a program capable of recovering a system, in the hidden area of a HDD.

It is another object of the present invention to provide an apparatus and method that can boot a system on the basis of an MBR stored in a hidden area of a HDD, and can recover the system using a recovery program stored in the hidden area.

It is another object of the present invention to provide an apparatus and method that can convert a system booted on the basis of an MBR (Master Boot Record) stored in a hidden area of an HDD (Hard Disk Drive) to a system before the booting.

It is another object of the present invention to provide an apparatus and method that can recover a system while maintaining data stored in a user area of a HDD.

It is another object of the present invention to provide an apparatus and method that can reflect partition information of a user area of a changed HDD in an MBR stored in a hidden area, when the format of the user area of the HDD is changed while a system is recovered on the basis of the MBR stored in the hidden area of the HDD.

It is yet another object of the present invention to provide an apparatus and method that can recover a system while minimizing a BIOS (Basic Input/Output System) load.

In accordance with an aspect of the present invention, the above and other objects can be accomplished by the provision of a method of managing a memory associated with a computer, the memory including a user area and a protected security area, (PSA), the user area including a management area, the method comprising: assigning a first partition to the user area; storing first partition information in the management area of the user area, the first partition information pertaining to the first partition; assigning a second partition to the PSA in response to an access signal, the access signal authorizing access to the PSA; storing, in the management area, second partition information pertaining to the second partition; storing the second partition information in the PSA; and removing the second partition information from the management area after storing the second partition information in the PSA.

In accordance with another aspect of the present invention, there is provided an apparatus for managing a memory associated with a computer, the memory including a user area and a protected security area (PSA), the user area including a management area, the apparatus comprising a combination of elements for assigning a first partition to the user area; for storing first partition information in the management area of the user area, the first partition information pertaining to the first partition; for assigning a second partition to the PSA in response to an access signal, the access signal authorizing access to the PSA; for storing, in the management area, second partition information pertaining to the second partition; for storing the second partition information in the PSA; and for removing the second partition information from the management area after storing the second partition information in the PSA.

In accordance with another aspect of the present invention, there is provided a computer system comprising: a user input unit; a display unit; a microprocessor to control the display unit and the user input unit; and a memory being controlled by the microprocessor and including a user area and a protected security area (PSA), the user area including a management area, wherein the user area includes a first partition, and first partition information stored in the management area, the first partition information pertaining to the first partition, the PSA includes a second partition and second partition information in response to an access signal, the access signal authorizing access to the PSA, the second partition information pertaining to the second partition, and the management area also stores therein the second partition information, which is removed after the second partition information is provided in the PSA.

In accordance with another aspect of the present invention, there is provided a computer program product embodied on at least one computer-accessible medium, for managing a memory associated with a computer, the memory including a user area and a protected security area (PSA), the user area including a management area, the computer program product comprising computer-executable instructions for: assigning a first partition to the user area; storing first partition information in the management area of the user area, the first partition information pertaining to the first partition; assigning a second partition to the PSA in response to an access signal, the access signal authorizing access to the PSA; storing, in the management area, second partition information pertaining to the second partition; storing the second partition information in the PSA; and removing the second partition information from the management area after storing the second partition information in the PSA.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Hereinafter, an apparatus and method for controlling a booting operation of a computer system in accordance with preferred embodiments of the present invention will be described in detail with reference to the annexed drawings.

Figure 1A:
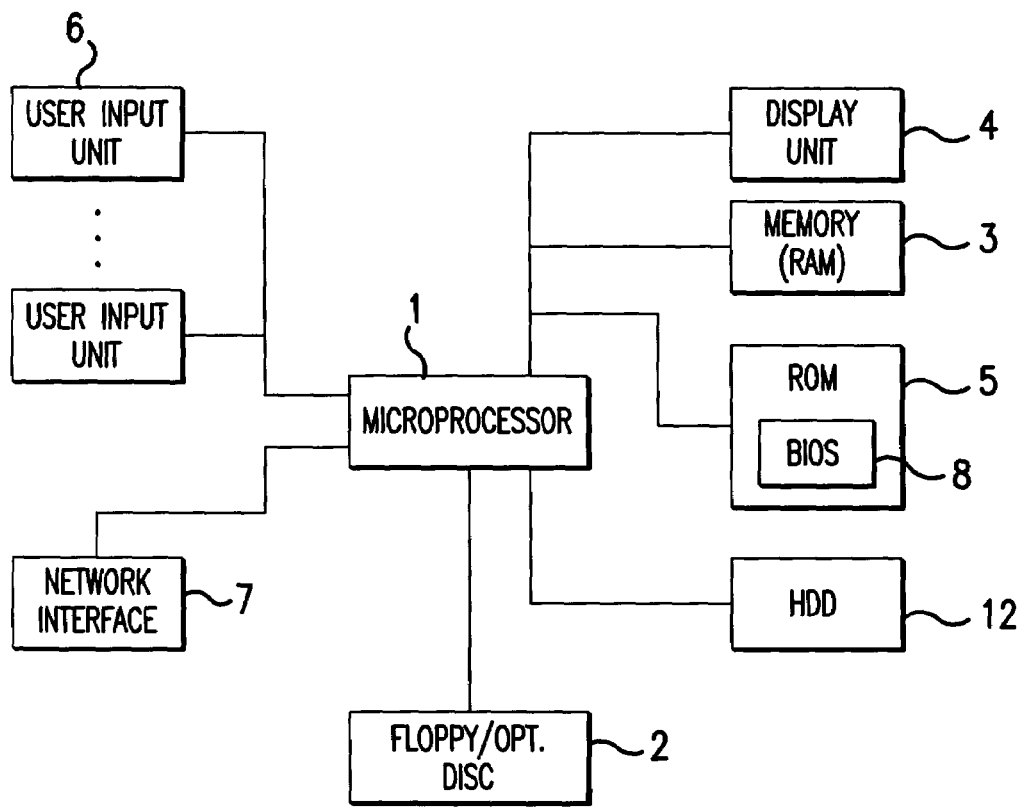
FIG. 1A is a block diagram illustrating the configuration of a computer to which the present invention is applied.
Figure 1B:
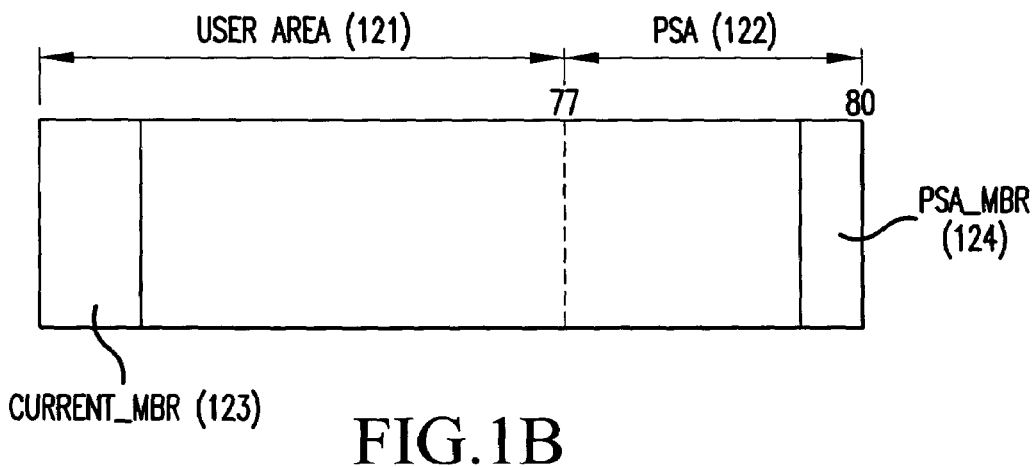
FIG. 1B shows a structure of a HDD in the computer of FIG. 1A.

FIG. 1A is a block diagram of a computer to which a method for controlling a booting operation in accordance with the present invention can be applied. FIG. 1A exemplarily shows the configuration of a notebook computer. However, the present invention is not limited to the notebook computers. FIG. 1B shows a structure of a HDD in the computer of FIG. 1A.

As shown in FIG. 1A, the notebook computer includes a microprocessor 1 for controlling the overall operations of the computer, a floppy disc/optical disc drive 2, a RAM 3, a display unit 4 such as a monitor, a flash memory 5, input units 6 such as a keyboard, a mouse, etc., a network interface 7, a HDD (Hard Disk Drive) 12, and any known component. All the components of the computer are operatively coupled and can carry out known operations.

For instance, the notebook computer can carry out a read/write operation, and conserve information even though power is cut off. The flash memory 5 stores programs and data necessary for a basic operation associated with routines to be used when the computer is turned on. The flash memory 5 carries out a storing operation in linkage to a BIOS 8 (Basic Input/Output System) serving as a program responsible for transmitting information between peripherals such as a memory, a disk drive and a monitor, requirements for setting a power management mode, and an optimum power management mode based on the requirements.

The flash memory 5 is also referred to as the ROM (Read Only Memory) BIOS storing the BIOS 8. The BIOS 8 sets an initial environment necessary for operating the system according to a user command so that an OS (Operating System) controls the computer, and carries out a function for booting the OS. That is, the BIOS executes a process for the booting operation after the system wakes up.

In accordance with the present invention, the BIOS 8 controls access to an area of the HDD 12. Generally the HDD 12 is divided into a recovery area for storing recovery data and a user area for storing various user data units. In particular, the BIOS 8 controls the recovery area in an active state only when an operation for recovering the system is carried out and controls the recovery area in an inactive state at other times so that the user cannot recognize the recovery area as the user area. A setup menu of the ROM BIOS includes menu items for controlling the recovery area in the active or inactive state. The setup menu of the ROM BIOS is stored in a CMOS (Complementary Metal Oxide Semiconductor) embedded in a core chipset.

The typical personal computer or notebook computer performs a sequence of system booting operations when a user turns on system power. At this point, in order that the computer system can operate normally, the BIOS 8 reads an MBR (Master Boot Record) stored in a first sector of the HDD 12 and reads a boot sector record of a partition storing an OS according to the read MBR to perform a system booting operation.

The MBR is information necessary for identifying a position and state of the OS to load the identified OS in a main memory unit of the computer, and is located in the first sector of the HDD 12. Moreover, the MBR is referred to as the "partition sector" or "master partition table" because the MBR includes information about a format, size and position of each partition when the HDD 12 is formatted. In addition, the MBR includes a program capable of reading the boot sector record of a partition storing the OS to be loaded in the memory. The boot sector record contains a program for loading the rest of the OS in the memory.

In more detail, the MBR is typically configured by one sector, and its size is typically 512 bytes. The first 446 bytes of 512 bytes are reserved for a boot code necessary for reading the OS, the next 64 bytes are reserved for partition information tables, and the last two bytes are reserved for a value necessary for identifying the MBR. Here, 16 bytes are required for each partition information table. Four partitions can be assigned to the HDD 12.

Each partition information table stores information pertaining to one or more partitions. This information is also referred to as partition information and includes a boot indicator for determining whether or not a corresponding partition is a booting partition, a start sector header and cylinder position of a corresponding partition, an end sector header and cylinder position of the corresponding partition, the total number of sectors of the corresponding partition, etc. In the partition information recorded in the MBR, the boot indicator indicates an active or bootable state for only one partition and indicates that other partitions are inactive or not bootable. The boot indicator indicates that an active partition is a booting partition. The system is booted on the basis of the OS recorded on a corresponding partition.

According to an embodiment of the present invention, as shown in FIG. 1B, the HDD 12 provided in the computer to which the present invention is applied, is divided into a user area 121 accessible by the OS and a hidden area inaccessible by the OS, for example, a PSA 122 (Protected Security Area).

A current MBR 123 ("Current_MBR") is recorded in the header of the HDD 12 and includes partition information of the user area 121 except for the PSA 122. Moreover, the user area 121 stores a typical OS such as Windows™ to be executed when the system is booted on the basis of the current MBR 123. Accordingly, when the system is booted on the basis of the current MBR 123, the system cannot access the PSA 122.

When the HDD 12 is manufactured or the computer including the HDD 12 is assembled and produced, a PSA MBR 124 ("PSA_MBR") is recorded on a specific section of the PSA 122, for example, at an end section of the PSA 122. The PSA MBR 124 includes partition information of the PSA 122 inaccessible by the typical OS. Moreover, partition information of an area except for the PSA 122, that is, partition information of the user area 121 accessible by the typical OS can be included in the PSA MBR 124. Accordingly, when the system is booted on the basis of the PSA MBR 124, the total HDD 12 including the PSA 122 can be accessed.

When the HDD 12 is manufactured or a computer including the HDD 12 is assembled and produced, the PSA 122 can store a specific OS to be executed when a booting operation is carried out on the basis of the PSA MBR 124, for example, a Win-PE (Windows Pre-installation Environment), a program for recovering the computer system, and an image file in which the OS installed in the user area 121 of the HDD 12 is compressed.

Because access to the PSA 122 is disabled when the system is typically booted on the basis of the current MBR 123, the PSA MBR 124, the specific OS, etc. recorded in the PSA 122 can be conserved without loss or damage.

However, when the current MBR 123 is replaced with the PSA MBR 124 and the system is booted on the basis of the PSA MBR 124, access to the total HDD 12 including the PSA 122 is enabled and also the booting operation based on the specific OS recorded on the PSA 122 can be performed.

Moreover, according to a method for adding partition information of the PSA 122 in the PSA MBR 124 to the current MBR 123 and changing a partition of the PSA 122 to a booting partition, the access to the PSA 122 is enabled and the booting operation on the basis of the specific OS stored in the PSA 122 is enabled.

PSA partition information is added to an available partition information area in a partition information table of the current MBR 123. On the other hand, when all partitions of the partition information table associated with the current MBR 123 are already designated, the last partition information of the table is backed up, and the PSA partition information can be recorded in place of the last partition information of the table. Of course, the last partition information replaced with the PSA partition information can be recovered by the backed-up information when a recovery mode ends.

The PSA MBR 124 including the PSA partition information can be useful when an error occurs in the computer system. In particular, when an error in a booting operation of the computer system is incurred, the current MBR 123 is replaced by the PSA MBR 124. In the recovery mode for booting the system on the basis of an undamaged specific OS, the recovery program can recover the computer system using the compressed image file. Here, in case a recovery mode item provided in the setup menu of the ROM BIOS of the computer system is selected or a specific key is pressed after power of the computer system is in an ON state, the recovery mode can be started.

In the specific OS of the recovery mode, the recovery program is automatically executed. The recovery program can newly designate a partition of the user area 121 according to a user selection operation or can maintain a pre-existing partition. Moreover, the OS installed in the user area 121 when the computer system is assembled and produced is newly installed in a partition of the user area 121 using the compressed image file stored in the PSA 122. In this case, because the changed current MBR can include partition information of the user area 121 before the recovery mode, data stored in the user area 121 can be maintained on the basis of the partition information of the user area 121. However, when the current MBR 123 is damaged before being changed, data stored in the user area 121 may not be always maintained.

The recovery program records partition information of the changed user area 121 on the current MBR 123, deletes PSA partition information, and again changes a booting partition to a partition in which the OS is newly installed.

Because the recovery program is used to mainly recover the computer system, it is preferred that a minimum program for recovering the computer system is constituted. The present invention is not limited to only the recovery program. Moreover, an application program such as a document editor, an audio playback program or a video playback program such as a DVD (Digital Versatile Disc) can be included.

It is preferred that the recovery program is constituted so that the user cannot arbitrarily record data on the PSA 122 or cannot delete data recorded on the PSA 122, so as to prevent damage of the PSA 122. The present invention does not limit the above-described constitution of the recovery program. Alternatively, the recovery program can be constituted so that the user can arbitrarily record or delete a file on the rest of the PSA 122 except for a part of the PSA 122 in which important data that must not be damaged is recorded.

Moreover, when a format of the HDD 12 is changed in a process for recovering the computer system in the recovery mode, for example, when a partition of the user area 121 of the HDD 12 is changed, the recovery program can add the changed partition information to the PSA MBR 124. Partition information of the user area 121 of the last changed HDD 12 is managed in the PSA MBR 124 so that a recovery operation can be carried out normally when an error is incurred in the computer system. That is, also when the current MBR 123 is damaged, data stored in the user area 121 can be recovered using partition information of the user area 121 added to the PSA MBR 124.

Of course, even though partition information of the changed user area 121 is added to the PSA MBR 124, the PSA partition information of the PSA MBR 124 is not affected by the added information. Moreover, the recovery program may not allow the PSA MBR 124 to be changed.

Figure 2:
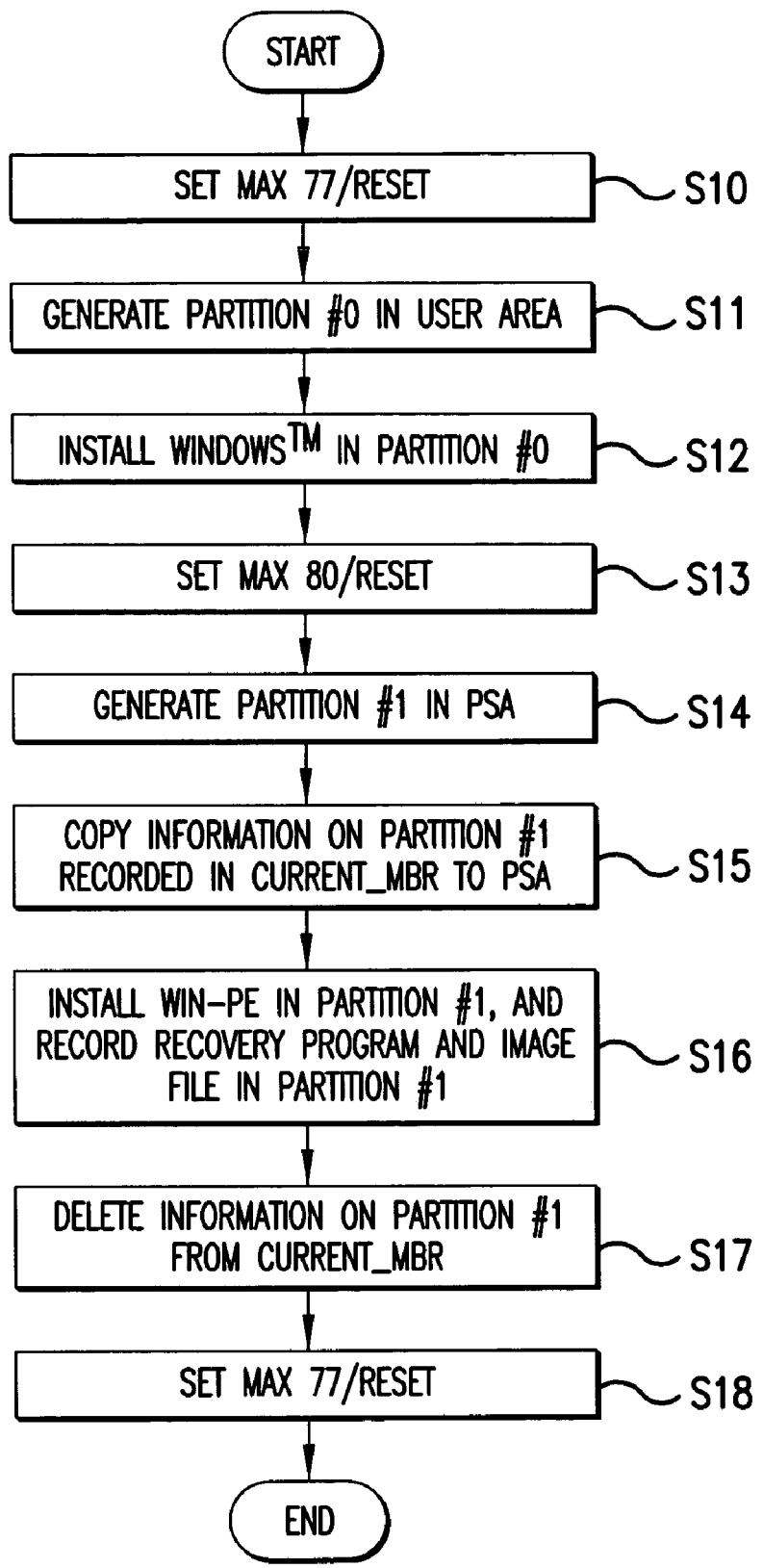
FIG. 2 illustrates a process for recording data necessary for recovering a system on an HDD to which the booting control method in accordance with the present invention is applied.

The process of recording management data in the HDD for recovery of the computer will be now described in more detail according to the present invention. FIG. 2 illustrates a process for recording on the HDD, data necessary for recovering a system to which a booting control method is applied in accordance with an embodiment of the present invention. The process of FIG. 2 is applied to the computer of FIG. 1A, but is equally applicable to any other computer.

In a process in which a computer is assembled and produced, an OS such as Windows™ is installed in a user area 121 of a HDD 12 of the computer. A specific OS is installed in a PSA 122 of the HDD 12 to boot the computer system in a recovery mode, and a recovery program for recovering the computer system and an image file in which an OS installed in the user area 121 is compressed are recorded in the PSA 122. PSA partition information and identification information for discriminating the HDD 12 from another HDD are recorded in the PSA 122. The PSA 122 becomes a hidden area.

For example, it is assumed that the total capacity of the HDD 12 is 80 Gbytes, and the total capacity of the PSA 122 is 3 Gbytes. When the HDD capacity of 80 Gbytes is changed to 77 Gbytes, a command "Set Max 77" is executed so that the PSA 122 in effect becomes a hidden area inaccessible by the computer. When the command is executed, firmware of the HDD 12 is changed. Subsequently, the computer system recognizes the changed HDD capacity and does not recognize the PSA 122. The changed HDD capacity is applied after the computer system is reset.

Figure 3A:
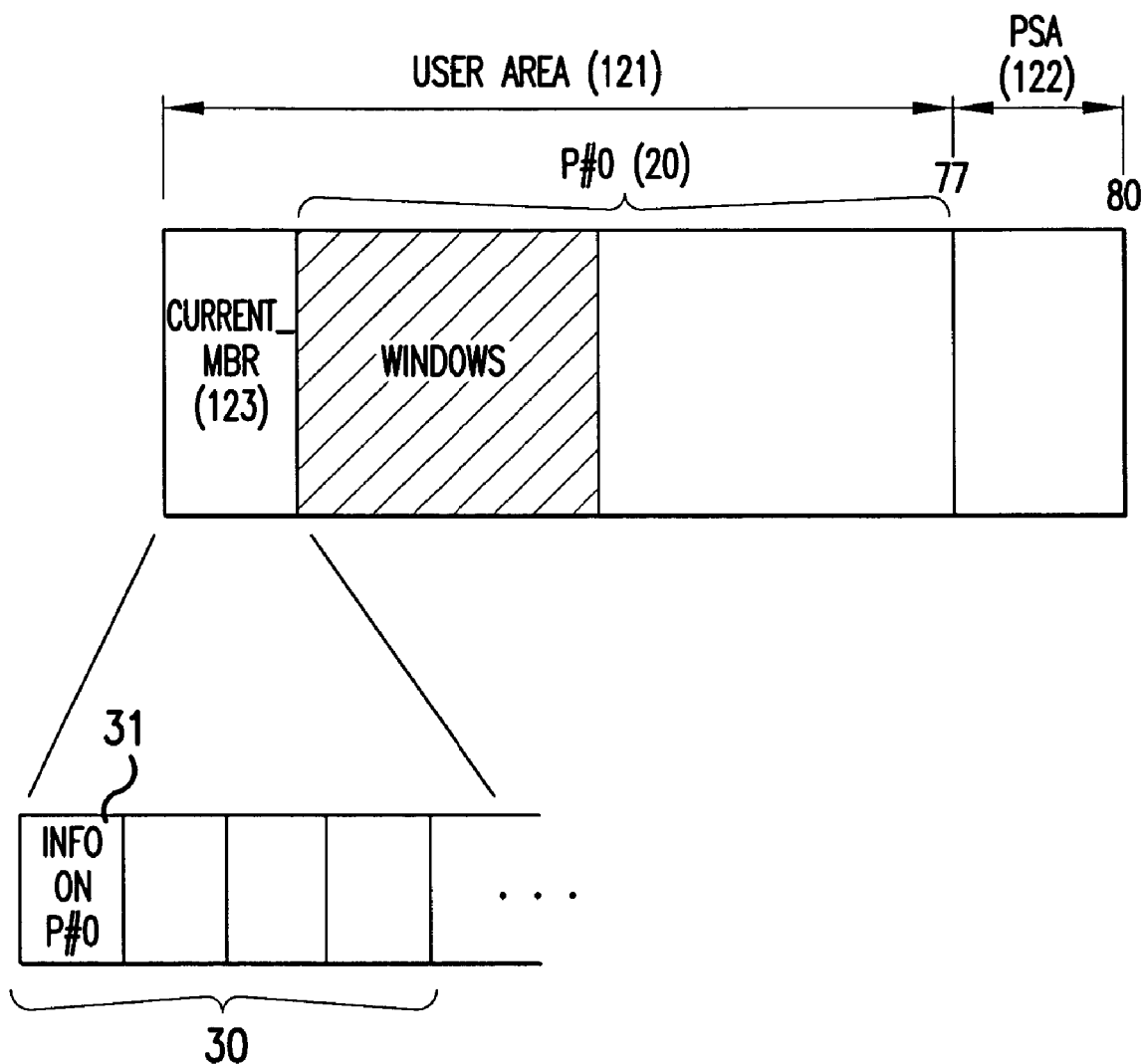
FIGS. 3A, 3B and 3C show examples of certain steps of FIG. 2.

In this regard, referring to FIG. 2, a program for recording data necessary for recovering the HDD 12 executes the command "Set Max 77" to reset the computer (S10). When an arbitrary size of a partition "Partition #0" is allocated to the user area 121 of the HDD 12 whose capacity is recognized as 77 Gbytes, an information table associated with Partition #0 is formed in a current MBR 123 of the HDD 12 (S11). Moreover, an OS such as Windows™ is installed in the Partition #0 (S12). An example of steps S11 and S12 is illustrated in FIG. 3A. As shown in FIG. 3A, a Partition #0 20 is allocated in the user area 121 in which Windows™ is installed. Information on the Partition #0 is stored in a first section 31 of an MBR partition area 30 in the current MBR 123.

Subsequently, a command "Set Max 80" is executed and then the computer is reset (S13).

Then a partition (e.g., "Partition #1") having a size of 3 Gbytes in the remaining 3-Gbyte area (or PSA 122) of the HDD 12 whose capacity is recognized as 80 Gbytes, is generated (S14). An information table associated with Partition #1 is recorded in the current MBR 123 (S14). The PSA MBR 124 including information associated with Partition #1 is also recorded on the last sector of the PSA 122 (S15). Additionally, information associated with Partition #0 can be recorded. In this process, an identification code can be additionally recorded on the last sector of the PSA 122 to discriminate the HDD 12 from another HDD.

Subsequently, Partition #1 is changed to a booting partition. A specific OS (e.g., Win-PE (Windows Pre-installation Environment)) to be executed when the computer system carries out the booting operation in a state where a partition of the PSA 122 is set as the booting partition, is installed in the PSA 122, and a recovery program and an image file in which an OS installed in Partition #0 is compressed are recorded in the PSA 122 (S16).

Figure 3B:
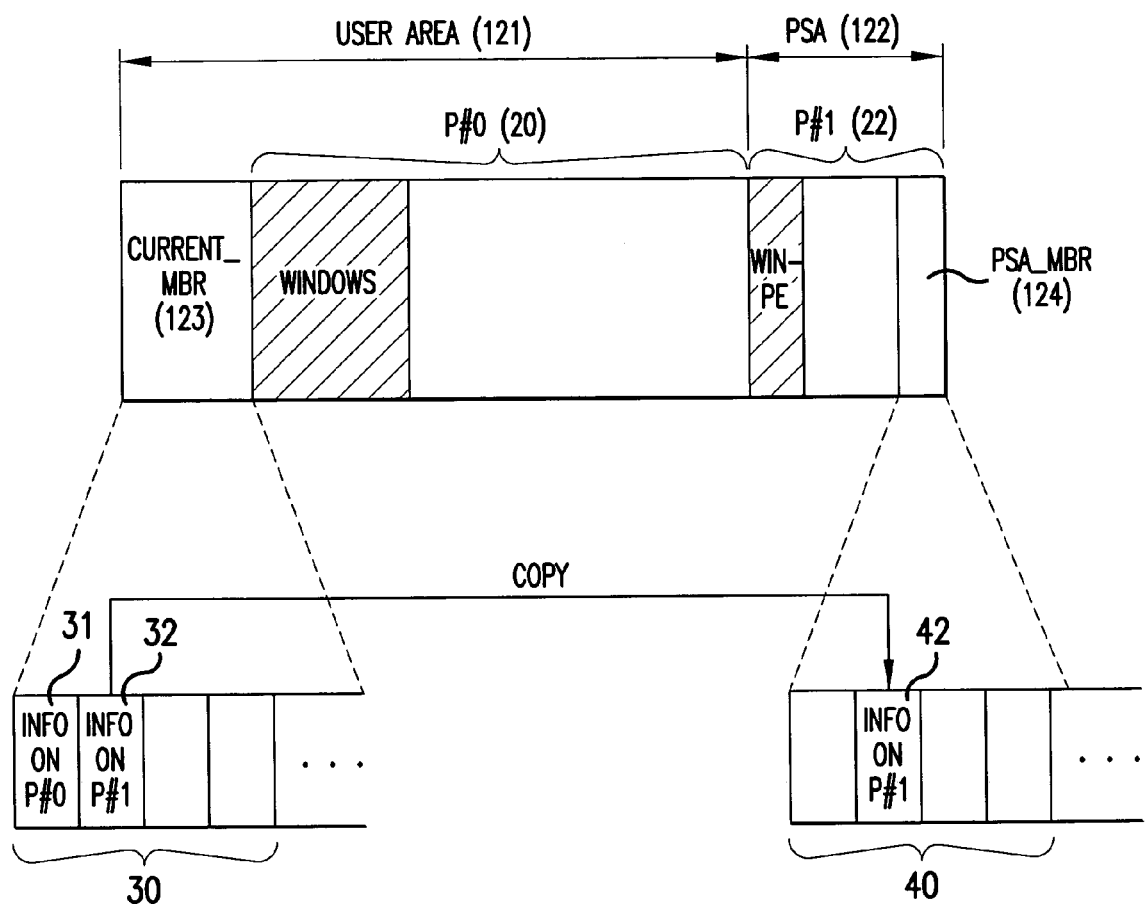

An example of steps S14-S16 is illustrated in FIG. 3B. For instance, Partition #1 22 having a size of 3 Gbytes is allocated in the PSA 122. An information pertaining Partition #1 is then recorded in a second section 32 of the MBR partition area 3, and also copied in a section 42 of a PSA partition area 40 of the PSA MBR 124. A Win-PE is also recorded in the PSA 122. As a result, Windows™ is now installed in Partition #0 of the HDD 12, Win-PE is now installed in the PSA 122, and the recovery program, the Windows™ image file and the PSA partition information are recorded in the PSA 122. The PSA MBR 124 may be located in the last sector of the PSA 122.

Figure 3C:
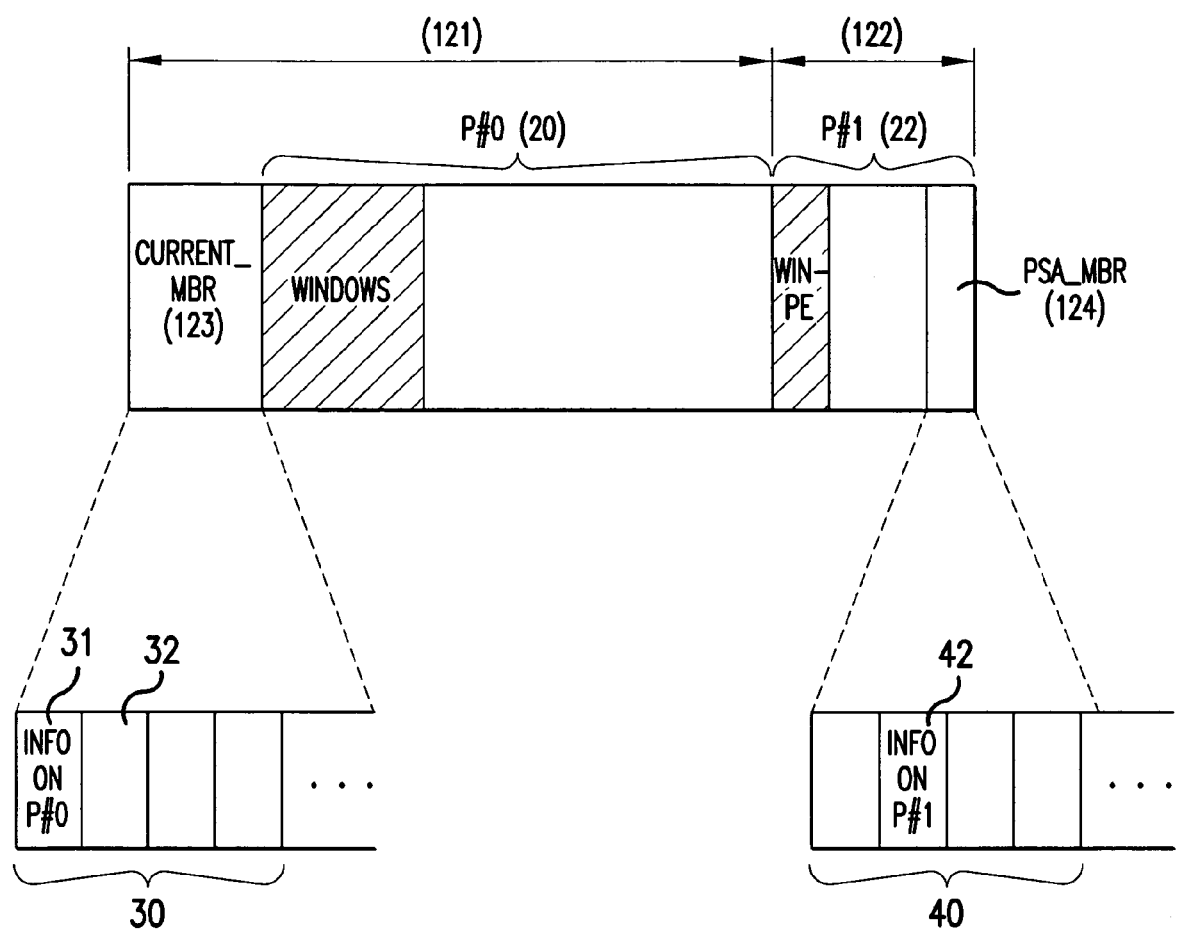

Subsequent to step S16, the information pertaining to Partition #1 is deleted from the current MBR 123. This is illustrated in FIG. 3C as an example. Then Partition #0 is again designated as a booting partition of the HDD 12 (S17). Moreover, the command "Set Max 77" is executed and then the computer is reset so that Partition #1, i.e., the PSA 122, is once again set as the hidden area (S18) which is selectively accessible only in certain situations.

Figure 4:
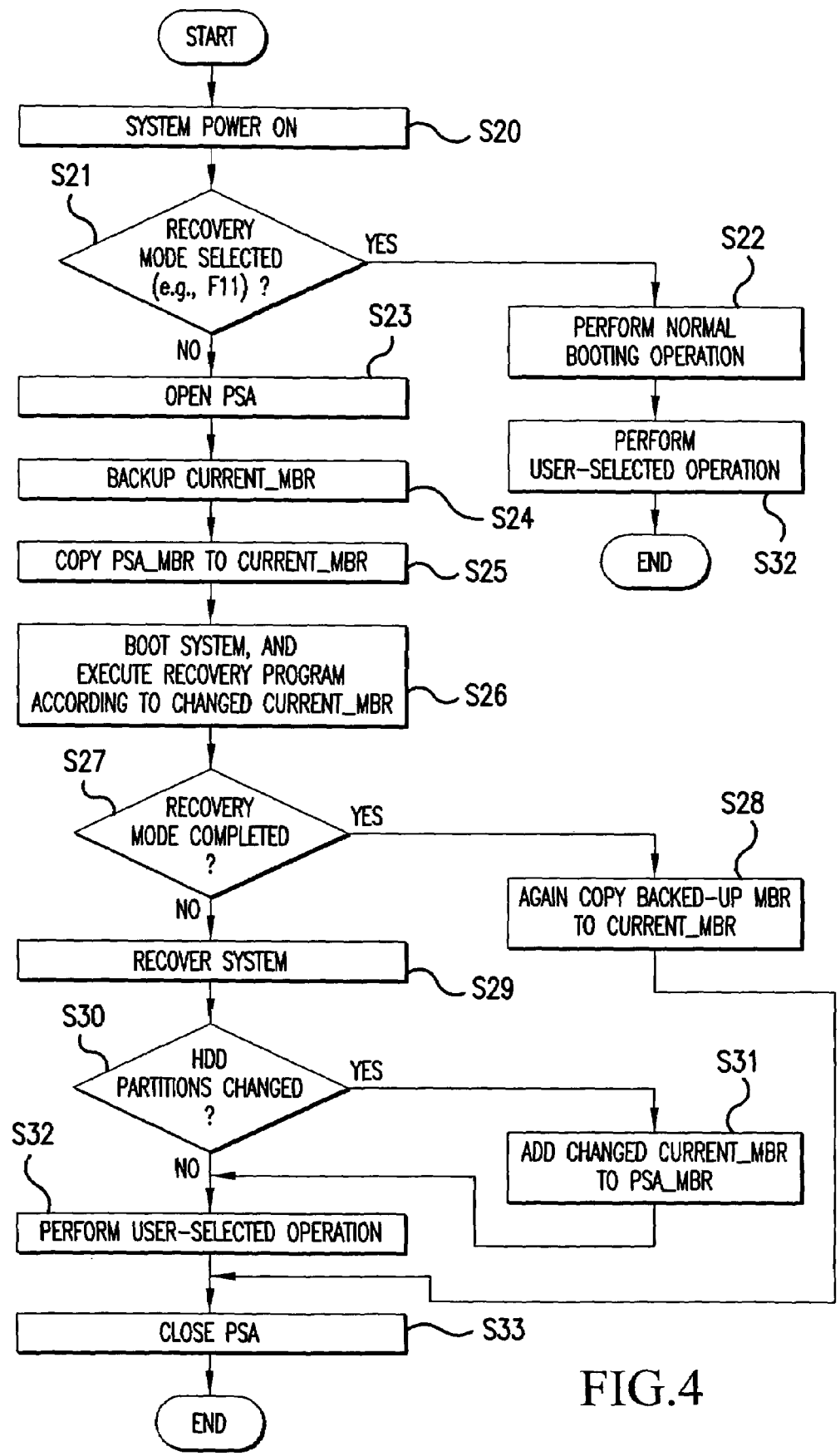
FIG. 4 is a flowchart illustrating a method for controlling a booting operation of a computer system in accordance with an embodiment of the present invention.

FIG. 4 is a flowchart illustrating a method for controlling a booting operation of a computer system in accordance with the present invention. This method is implemented using the computer of FIG. 1A or any other suitable computer. The HDD to which the method of FIG. 4 is applied includes the PSA MBR 124 in the PSA 122, the specific OS (Operating System) and the recovery program as discussed above in connection with FIG. 2.

Referring to FIG. 4, when a user (e.g., an end-user or system administrator) turns on the system power supply in the computer equipped with the HDD 12 (S20), the BIOS 8 to which the present invention is applied determines whether or not a specific key (e.g., F11) has been inputted, that is, whether or not a recovery mode has been selected, within a predetermined time after the power supply is turned on (S21).

If no specific key has been inputted, the BIOS 8 reads the current MBR 123 recorded in the header of the HDD 12 in a state where the PSA 122 of the HDD 12 is set as the hidden area, and performs a normal booting operation for the computer system according to a result of reading the current MBR 123 (S22) and any user-selected operation in response to the user input (S32).

On the other hand, if the specific key has been inputted as a result of the determination at step S21, the BIOS 8 sets the capacity of the HDD 12 to the total capacity of the HDD 12 including the PSA 122, such that the PSA 122 can be accessed (S23).

Figure 5A:
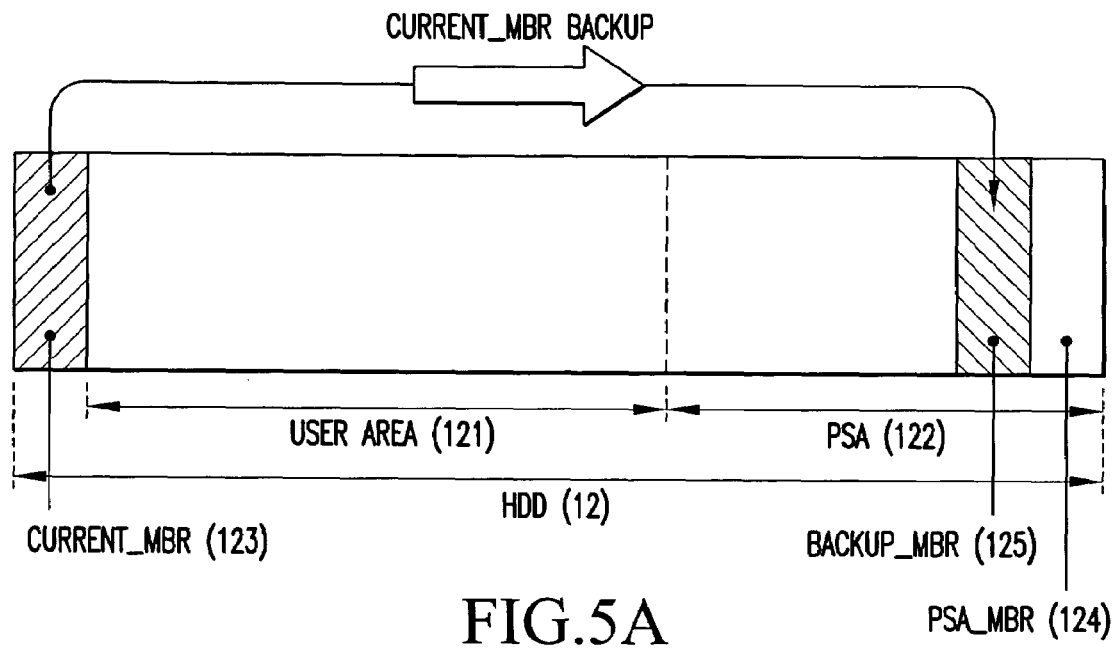
FIGS. 5A, 5B and 5C illustrate a process in which an MBR is copied and backed up by the method of FIG. 4.

The BIOS 8 performs a booting operation in a recovery mode using the PSA MBR 124 (e.g., partition information on Partition #1) stored in the PSA 122 of the HDD 12. Before the booting operation in the recovery mode, the BIOS 8 sequentially performs a backup operation for the current MBR 123 (S24) and a copy operation for copying the PSA MBR 124 to the current MBR 123 (S25). For instance, as shown in FIG. 5A, the BIOS reads the current MBR 123 recorded in the header of the HDD 12 and the read current MBR is backed up to another specific section of the PSA 122, for example, before the PSA MBR 124 (S24).

Figure 5B:
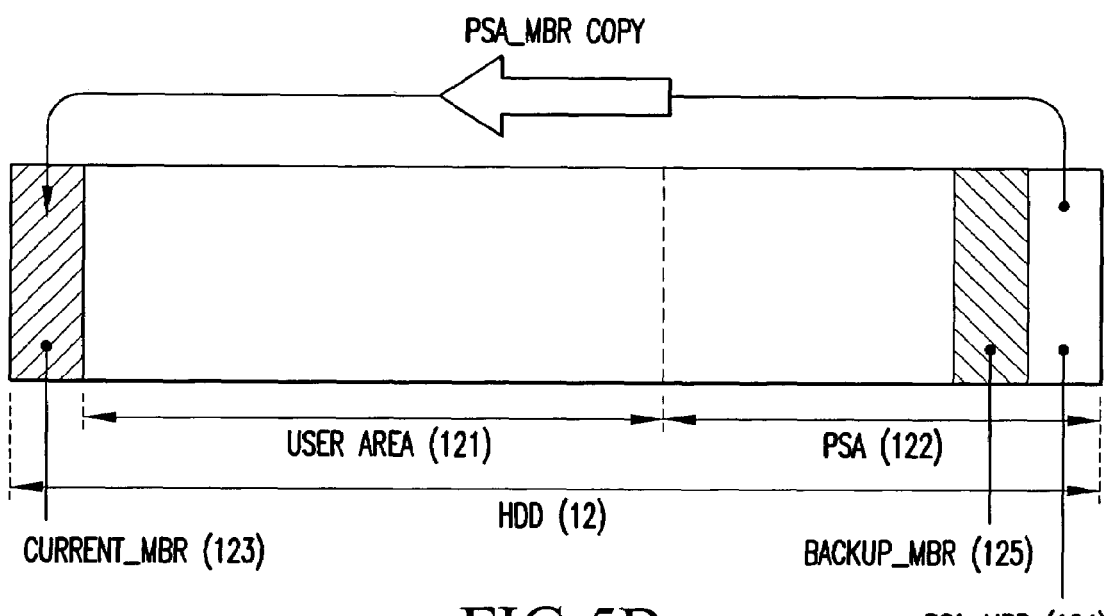

Subsequent to step S25 of FIG. 4, the BIOS 8 reads the PSA MBR 124 stored at the end of the PSA 122 of the HDD 12 and copies the read PSA MBR to the header of the HDD 12 as shown in FIG. 5B. Alternatively, the BIOS 8 adds PSA partition information from the PSA MBR 124 to the current MBR 123 and corrects the current MBR 123 so that a PSA partition can be set as a booting partition (S25). Moreover, when the read current MBR 123 is damaged, the damaged current MBR 123 can be changed according to the partition information of the user area 121 of the HDD 12 included in the PSA MBR 124.

Subsequently, the BIOS 8 reads the current MBR 123 changed by the PSA MBR 124 and boots the computer system with the specific OS stored in the PSA 122 according to a result of reading the current MBR 123 (S26). The recovery program is automatically executed in the booted specific OS (S26).

When the user makes a recovery request, the recovery program again installs an OS installed when the computer is produced, a relative application program, etc. (S29). At this point, the recovery program newly designates a partition of the user area 121 according to the user's selection operation or maintains a pre-existing partition, and newly installs the OS in the user area 121 using the compressed image file stored in the PSA 122. In this process, partition information on the changed user area 121 is added to the current MBR 123, PSA partition information is deleted, and a partition in which the OS is newly installed is changed to a booting partition. Moreover, another application program can be installed and executed under control of the user.

When the user again boots the computer system in a state where a recovery operation is not executed in the recovery mode or terminates the recovery mode (S27), the recovery program reads the backup MBR 125 ("BackUp_MBR") from the PSA 122 and copies the read backed-up MBR to the position in which the current MBR 123 was originally present (S28). This is to give right to select the recovery operation in the recovery mode to the user. That is, a system state after the recovery mode returns to that before the recovery mode.

Figure 5C:
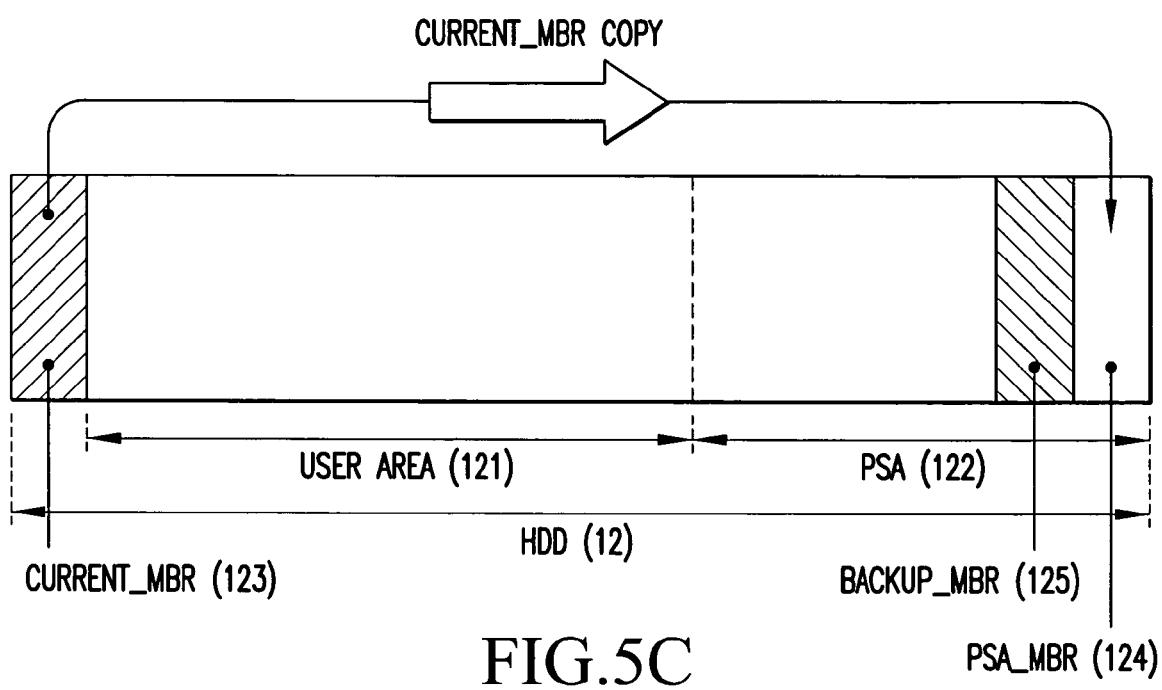

Moreover, when a partition in the user area 121 of the HDD 12 is changed in a process for recovering the computer system in the recovery mode (S30), the specific OS can selectively add the changed partition information to the PSA MBR 124 as shown in FIG. 5C (S31).

Subsequently, another application program is installed or the application program is executed according to the user's selection operation (S32). When the recovery mode transits to another operating mode in a state where the recovery operation has been completed or is never performed, the BIOS 8 sets a capacity value of the HDD 12 to a result value when a capacity value of the PSA 122 is subtracted from the total capacity value of the HDD 12, thereby changing the PSA 122 to the hidden area inaccessible by the normal OS (S33).

When the computer is again in an ON state, the BIOS 8 reads the changed current MBR 123, and boots the computer system with a newly installed OS according to a result of the reading.

After the computer is in the ON state, the BIOS 8 determines whether or not a current HDD is the same HDD as at the time of producing the computer before determining whether or not a specific key is inputted after the computer is turned on. That is, the BIOS 8 determines whether or not the HDD has been changed by the user. When determining that the current HDD is not the original, the BIOS may not perform the recovery operation in accordance with the present invention. This is because the booting control method in accordance with the present invention operates together with the HDD 12 having a PSA 122 storing a PSA MBR, a specific OS, a recovery program, etc. Moreover, the PSA 122 of the HDD 12 can store identification information for discriminating the HDD 12 in a specific section of the PSA 122, that is, an end sector of the PSA 122.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

As apparent from the above description, the present invention provides an apparatus and method for controlling a booting operation in a computer system that can eliminate the cost of manufacturing a recovery CD-ROM (Compact Disc-Read Only Memory) since an additional recovery CD-ROM is not required by storing recovery data to be provided to a user in a predetermined area of a HDD.

Moreover, the present invention provides an apparatus and method for controlling a booting operation in a computer system that can conveniently and easily recover the system using a recovery program stored in a HDD, thereby removing the inconvenience of managing a recovery CD-ROM.

Moreover, the present invention provides an apparatus and method for controlling a booting operation in a computer system that can maintain data stored in a user area of a HDD while recovering the system.

Moreover, the present invention provides an apparatus and method for controlling a booting operation in a computer system that can minimally change a BIOS to control the booting operation, thereby minimizing a BIOS load for recovering the computer system.

Although the preferred embodiments of the present invention have been disclosed for illustrative purposes, those skilled in the art will appreciate that various modifications, additions and substitutions are possible, without departing from the scope of the invention.

What is claimed is:

1. A method of managing a memory associated with a computer, the memory including a user area and a protected security area (PSA), the user area including a management area, the method comprising:

assigning a first partition to the user area;
storing first partition information in the management area of the user area, the first partition information pertaining to the first partition;
assigning a second partition to the PSA in response to an access signal, the access signal authorizing access to the PSA;
storing, in the management area, second partition information pertaining to the second partition;
storing the second partition information in the PSA; and
removing the second partition information from the management area after storing the second partition information in the PSA.

2. The method of claim 1, wherein the assigning of the first partition and the storing of the first partition information occur simultaneously.

3. The method of claim 1, wherein the assigning of the second partition and the storing of the second partition information in the management area occur simultaneously.

4. The method of claim 1, wherein the step of storing the second partition information in the PSA includes:
copying the second partition information from the management area into the PSA.

5. The method of claim 1, wherein the step of assigning the first partition occurs in response to a limiting signal, the limiting signal limiting access to the PSA.

6. The method of claim 1, further comprising:
setting the memory to limit access to the PSA after the removing step.

7. The method of claim 1, wherein in the step of assigning the first partition, the memory is a hard disc drive associated with the computer.

8. The method of claim 1, further comprising:
storing at least one recovery program in the second partition.

9. The method of claim 8, further comprising:
executing the at least one recovery program when a recovery mode is selected.

10. The method of claim 9, further comprising:
storing, in the PSA, a copy of information stored in the management area when the recovery mode is selected.

11. The method of claim 1, further comprising:
adjusting a size of at least one partition of the memory in response to a user input;
updating the management area in accordance with the adjusted size of the at least one partition; and
storing, in the PSA, a copy of information in the updated management area.

12. The method of claim 1, wherein the user area is accessible by an end user, and the PSA is not accessible by the end user.

13. The method of claim 1, wherein the management area is a master boot record (MBR) area located at a first section of the user area.

14. The method of claim 1, further comprising:
inserting an identification code in the PSA, the identification code identifying the memory; and
controlling a recovery operation of the memory based on the identification code.

15. An apparatus for managing a memory associated with a computer, the memory including a user area and a protected security area (PSA), the user area including a management area, the apparatus comprising:
means for assigning a first partition to the user area;
means for storing first partition information in the management area of the user area, the first partition information pertaining to the first partition;
means for assigning a second partition to the PSA in response to an access signal, the access signal authorizing access to the PSA;
means for storing, in the management area, second partition information pertaining to the second partition;
means for storing the second partition information in the PSA; and
means for removing the second partition information from the management area after storing the second partition information in the PSA.

16. The apparatus of claim 15, wherein the assigning of the first partition and the storing of the first partition information occur simultaneously.

17. The apparatus of claim 15, wherein the assigning of the second partition and the storing of the second partition information in the management area occur simultaneously.

18. The apparatus of claim 15, wherein the means for storing the second partition information in the PSA copies the second partition information from the management area into the PSA.

19. The apparatus of claim 15, wherein the means for assigning the first partition assigns the first partition in response to a limiting signal, the limiting signal limiting access to the PSA.

20. The apparatus of claim 15, further comprising:
means for limiting access to the PSA, wherein the access to the PSA is limited after the means for removing removes the second partition information from the management area.

21. The apparatus of claim 15, wherein the memory is a hard disc drive associated with the computer.

22. The apparatus of claim 15, further comprising:
means for storing at least one recovery program in the second partition.

23. The apparatus of claim 22, further comprising:
means for executing the at least one recovery program when a recovery mode is selected.

24. The apparatus of claim 23, further comprising:
means for storing, in the PSA, a copy of information stored in the management area when the recovery mode is selected.

25. The apparatus of claim 24, further comprising:
means for adjusting a size of at least one partition of the memory in response to a user input;
means for updating the management area in accordance with the adjusted size of the at least one partition; and
means for storing, in the PSA, a copy of information in the updated management area.

26. The apparatus of claim 15, wherein the user area is accessible by an end user, and the PSA is not accessible by the end user.

27. The apparatus of claim 15, wherein the management area is a master boot record (MBR) area located at a first section of the user area.

28. The apparatus of claim 15, further comprising:
means for inserting an identification code in the PSA, the identification code identifying the memory; and
means for controlling a recovery operation of the memory based on the identification code.

29. A computer system comprising:
a user input unit;
a display unit;
a microprocessor to control the display unit and the user input unit; and
a memory being controlled by the microprocessor and including a user area and a protected security area (PSA), the user area including a management area, wherein the user area includes a first partition, and first partition information stored in the management area, the first partition information pertaining to the first partition, the PSA includes a second partition and second partition information in response to an access signal, the access signal authorizing access to the PSA, the second partition information pertaining to the second partition, and the management area also stores therein the second partition information, which is removed after the second partition information is provided in the PSA.

30. A computer program product embodied on at least one computer-accessible storage medium, for managing a memory associated with a computer, the memory including a user area and a protected security area (PSA), the user area including a management area, the computer program product comprising computer-executable instructions for:

assigning a first partition to the user area;

storing first partition information in the management area of the user area, the first partition information pertaining to the first partition;

assigning a second partition to the PSA in response to an access signal, the access signal authorizing access to the PSA;

storing, in the management area, second partition information pertaining to the second partition;

storing the second partition information in the PSA; and removing the second partition information from the management area after storing the second partition information in the PSA.

31. The computer program product of claim 30, wherein the assigning of the first partition and the storing of the first partition information occur simultaneously.

32. The computer program product of claim 30, wherein the assigning of the second partition and the storing of the second partition information in the management area occur simultaneously.

33. The computer program product of claim 30, wherein the computer-executable instructions for storing the second partition information in the PSA include computer-executable instructions for:

copying the second partition information from the management area into the PSA.

34. The computer program product of claim 30, wherein the computer-executable instructions for assigning the first partition assign in response to a limiting signal, the limiting signal limiting access to the PSA.

35. The computer program product of claim 30, further comprising computer-executable instructions for:

setting the memory to limit access to the PSA after the second partition information is removed from the management area.

36. The computer program product of claim 30, wherein the memory is a hard disc drive associated with the computer.

37. The computer program product of claim 30, further comprising computer-executable instructions for:

storing at least one recovery program in the second partition.

38. The computer program product of claim 37, further comprising computer-executable instructions for:

executing the at least one recovery program when a recovery mode is selected.

39. The computer program product of claim 38, further comprising computer-executable instructions for:

storing, in the PSA, a copy of information stored in the management area when the recovery mode is selected.

40. The computer program product of claim 30, further comprising computer-executable instructions for:

adjusting a size of at least one partition of the memory in response to a user input;

updating the management area in accordance with the adjusted size of the at least one partition; and storing, in the PSA, a copy of information in the updated management area.

41. The computer program product of claim 30, wherein the user area is accessible by an end user, and the PSA is not accessible by the end user.

42. The computer program product of claim 30, wherein the management area is a master boot record (MBR) area located at a first section of the user area.

43. The computer program product of claim 30, further comprising computer-executable instructions for:

inserting an identification code in the PSA, the identification code identifying the memory; and controlling a recovery operation of the memory based on the identification code.

* * * * *